3,158,394
DETACHABLE SAUCEPAN HANDLE
Anthony W. Serio, Elmira, N.Y., assignor to Youngstown
Steel Door Company, Cleveland, Ohio, a corporation
of Ohio
Filed Oct. 11, 1961, Ser. No. 144,416
9 Claims. (Cl. 294—31)

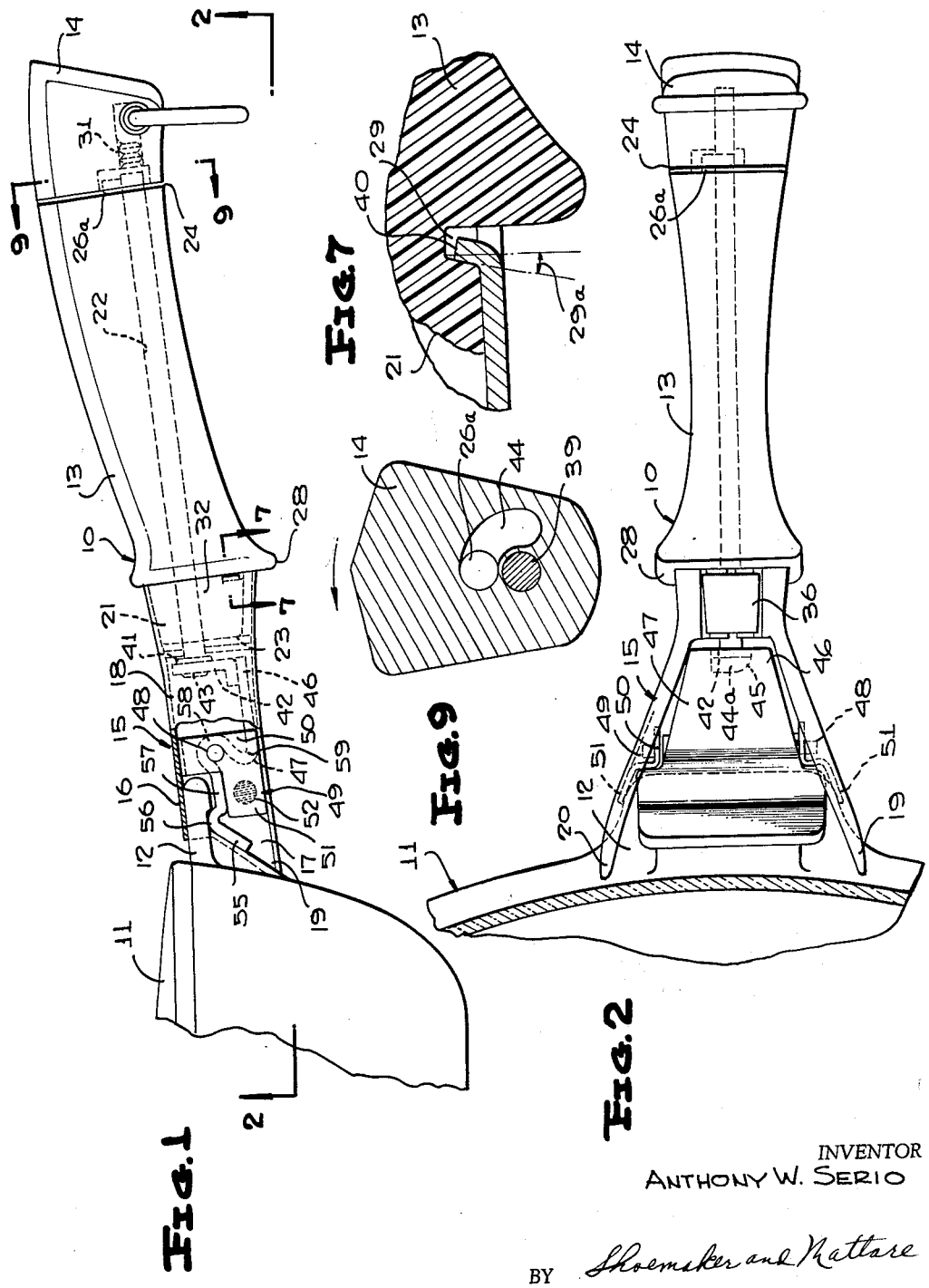

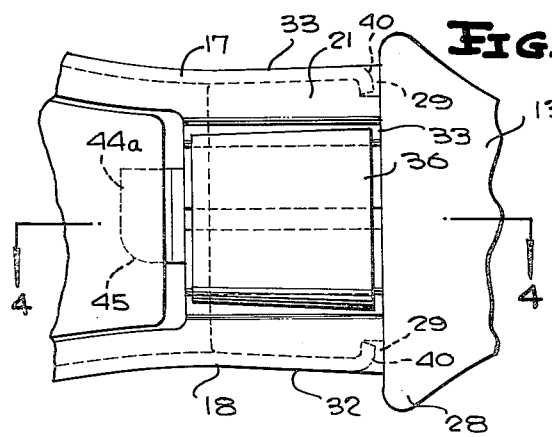
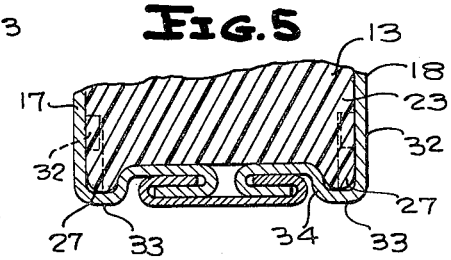
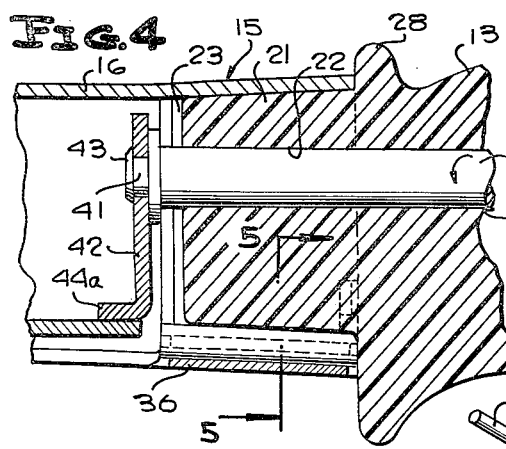
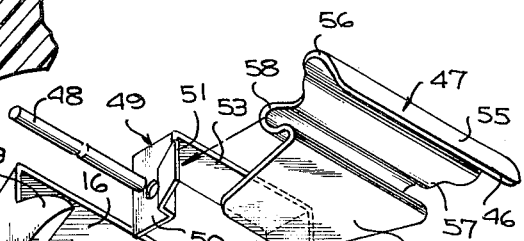
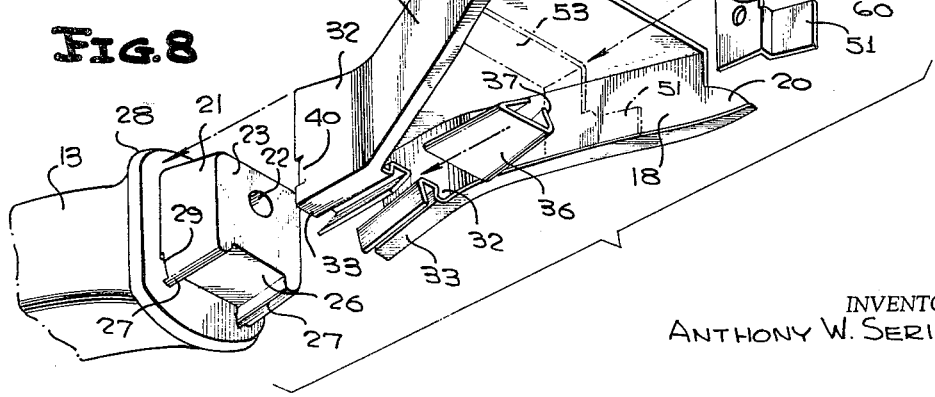
INVENTOR
ANTHONY W. SERIO
BY Shoemaker and Mattire
ATTORNEYS

United States Patent Office 3,158,394
Patented Nov. 24, 1964

The present invention relates to detachable handles for saucepans and the like, and more particularly to a positive lock mechanism for detachably securing a handle assembly to saucepans and similar articles.

The present invention is particularly useful for casseroles, in which the dish is disposed in the oven during the cooking or heating process and thereafter a removable handle assembly is provided for removing it from the hot oven without having to touch the hot dish or come in contact with it so that the dish may be placed on the table.

It is an object of the present invention to provide an improved detachable handle assembly incorporating a rotatable end portion connected with a clamping mechanism at the opposite end thereof, which rotatable end portion actuates the clamping mechanism and serves to detachably connect the handle to the saucepan, dish or the like.

It is another object of the present invention to provide an improved detachable handle assembly comprising an elongate body portion having a bore extending therethrough with an actuating rod extending through the bore and carrying at the inner saucepan end thereof a cam element associated with clamping means for actuating the clamping means into and out of locked-gripping engagement with a saucepan, dish or the like, with the opposite outer end of the rod being attached to a rotatable end handle portion so that the cam element may be actuated thereby.

It is another object of the present invention to provide a detachable handle assembly for detachably securing the handle to a dish, casserole or the like, and in which the handle assembly is permanently secured together without requiring the use of any screws, nuts, rivets and the like which may become loosened and thus come apart.

It is another object of the present invention to provide a handle assembly for detachably connecting it to a saucepan provided with lug means which prevent the intermediate portion of the handle assembly from becoming detached from the clamping extension or clamping portion of the handle assembly that grips the dishpan.

It is still a further object of the present invention to provide a handle assembly provided with clip means for attaching the clamping section of the handle assembly to the intermediate body portion thereof which will compensate for any variation in the size of the handle so that the clamping portion and intermediate handle body will be permanently secured to one another.

It is yet another object of the present invention to provide tapered clip means for securing the clamping extension or portion of a detachable handle assembly to the intermediate portion of the handle in which the tapered clip means is placed over ear means on the intermediate body portion so that when these parts are pressed together, the clamping portion and the intermediate body portion are permanently secured together as a solid unit for assembly.

It is another object of the present invention to provide a detachable handle assembly for use with a dishpan and the like in which the pivot pin holder means for the clamp means is positioned within the clamping extension or portion of the handle assembly and permanently welded in place therein, thus eliminating the use of rivets or head means on the pin to securely lock the clamp means in the clamping portion and eliminate the usual problem of the head or rivet becoming worn so that the pivot pin becomes loosened and comes apart, as in assemblies used heretofore.

Various other objects and advantages of the present invention will become readily apparent from the following detailed description when considered in connection with the accompanying drawings forming a part thereof, and in which:

FIG. 1 is a side elevational view of the handle assembly embodied in the present invention shown clamped to a utensil or dish;

FIG. 2 is a bottom plan view of the handle assembly shown in FIG. 1;

FIG. 3 is a fragmentary enlarged bottom plan view of the portion of the handle assembly adjacent the clamping extension and the front end of the intermediate body portion;

FIG. 4 is a cross section taken along lines 4—4 of FIG. 3;

FIG. 5 is a detail view of the tapered clip means embodied in the present invention, taken along line 5—5 of FIG. 4, after the clamping extension or portion has been permanently secured to the intermediate body portion of the handle assembly;

FIG. 6 is a view similar to FIG. 5, before the tapered clip means embodied in the handle assembly of the present invention is pressed or deformed into its permanent configuration to join the clamping extension to the intermediate body portion of the handle assembly;

FIG. 7 is a detail view of lug means formed on the clamping extension or portion of the handle assembly to prevent longitudinal detachment of the clamping extension from the intermediate body portion of the handle assembly;

FIG. 8 is an exploded view of the handle assembly including the intermediate body portion and the clamping portion; and FIG. 9 is a transverse section taken along lines 9—9 of FIG. 8, illustrating the rotational direction of the end portion.

Referring to the figures, the reference numeral 10 generally indicates the handle assembly for detachably connecting it to a dish 11. The dish or casserole 11 is provided with a peripheral extension or lip 12 on its rim portion which is adapted to receive and be gripped by the detachable handle assembly 10. The handle assembly consists essentially of an intermediate main body portion 13, a separate actuating end portion 14 disposed at one end thereof, and a clamping extension or portion 15 disposed on the opposite inner end thereof.

The clamping portion 15 is preferably formed of metal and includes a substantially horizontal plate-like top or upper portion 16 with vertically depending sides or flange portions 17 and 18 as most clearly shown in FIG. 8, disposed along the opposite sides thereof. The flanges terminate at their forward free ends into forwardly projecting wing portions 19 and 20. The extremities of the wing portions 19 and 20 are adapted to bear against the outer side of the dish 11 as best shown in FIGS. 1 and 2, with the other portions of the clamping extension clampingly engaged with the rim projection or lip 12 so that the handle is securely held in a fixed and stabilized position with respect to the dish when in the clamped position, while at the same time the handle assembly as hereinafter described readily permits quick detachment from the dish.

The intermediate portion 13 of the handle assembly is preferably made of a hard plastic material and is provided at its forward end with a generally rectangularly reduced extension 21. Projecting longitudinally through this handle portion is a bore 22 which opens upon the end face 23 of the extension 21 and upon the rear face 24 of the handle portion.

The extension 21 tapers rearwardly so that the rear portion is slightly larger than the forward portion adjacent face 23 and the bottom of the extension is provided with a longitudinally extending substantially rectangular recess 26 therein formed by longitudinally extending ribs 27 on opposite sides thereof. The portion of extension 21 adjacent the rear end or rear face of the extension is provided with angled recesses or slots 29 therein as indicated by 29a in FIG. 7 on opposite sides of the extension for preventing the clamping assembly 15 from sliding off the extension 21 of the intermediate body portion 13, as hereinafter described.

The rear portions of flanges 17 and 18 generally designated 32 extend below extension 21 and are provided with inwardly extending or turned tabs or trough portions 33 (see FIGS. 5, 6) adapted to encompass or embrace the ribs 27 on extension 21 so that the clamping assembly can be slid over 21 and mounted thereon. The inwardly extending portions 33 have an inner wall or portion 34 which extends into recess 26 of the extension, and these portions thereafter extend substantially horizontally and have their inner free ends terminating in downwardly and outwardly extending flanges, ribs or ears 35 as best seen in FIGS. 6 and 8. This portion of the clamping assembly 15 is adapted to be pressed into abutting relationship within the recess 26 of the extension so that clamping assembly 15 is permanently secured to the intermediate portion 13, as hereinafter described.

The clamping assembly 15 is first mounted on extension 21 by taking the assembly 15 and sliding it over extension 21 so that the rear end of the clamping assembly 15 abuts the intermediate body 13 adjacent the enlarged flange 28 thereon next to extension 21. Thereafter, the portions 33, 34 and 35 of the clamping assembly are positioned as shown in FIG. 6. Thereafter, a tapered clip 36 is placed over the outside of ear portions 35, as illustrated in FIG. 6, so that the upwardly and inwardly extending legs 37 of the clip overlap the tabs 35 and the clip is then pressed home against the extension 21 until it is deformed into the configuration shown in FIG. 5, to thereby clamp the assembly to the intermediate body portion 13 in a fixed position thereon so that the body and the clamping assembly form a solid unit. The utilization of the tapered clip 36 also permits the clamping extension 15 and the body portion 13 to be properly secured together and will compensate for any variation in the size of the molded plastic handle.

The rear edges of the rear portions 32 of the flanges 17 and 18 are provided with detent portions or angled lugs 40 adapted to extend into and be engaged in the angled recesses 29 in the opposite sides of extension 21 so that the clamping extension 15, once the clip 36 is pressed home and secured to body 15, cannot slide longitudinally from extension 21 so as to inadvertently disengage the clamping extension from the body 13.

Projecting through the bore 22 and journalled therein is the actuating rod 39 shown in FIG. 1 and FIG. 4. The rod is threaded on one end portion 31 and is provided with a reduced opposite end portion 41 (see FIG. 4) which carries the cam element 42, the same being retained thereon by virtue of the headed-over portion 43 of the reduced portion 41. The actuating end portion 14 of the handle is threadably engaged with the threaded end portion 31 of the actuating rod as is shown in FIG. 1. Thus, the actuating end portion 14 is rotatably mounted with respect to the handle portion 13 through the medium of the actuating rod 39. The forward face of the end portion 14 is provided with an arcuate slot 44 as best seen in FIG. 9, at a constant radius to the actuating rod 39 to receive the stop pin element 26a therein. The stop pin element 26a projects outwardly from the rear face 24 of the handle portion 13, as best seen in FIGS. 1 and 2. This construction permits relative rotation of the portion 14 with respect to the handle body 13 within certain predetermined or specified limits, or in this case permits relative rotation of approximately 90°, or a quarter of a turn.

The previously mentioned cam 42 as seen in FIG. 4, is provided with a forwardly projecting foot portion 44a and the main body thereof is of elongate rectangular shape with the corner 45 (see FIG. 3) of the foot being rounded. This corner 45 is the one which is presented in rotation of the actuating rod 39 into engagement with the tongue 46 of a clamp element 47.

The clamp 47 is pivotally connected or disposed on a pivot pin element 48 disposed in a pivot pin holder 49. The pivot pin holder element 49 is substantially U-shaped and is provided with oppositely disposed legs 50 having aligned openings therein through which the pin element 48 extends. Each leg 50 is provided with laterally extending ears 51 thereon which extend in a direction away from extension 21 and are bent outwardly of the legs 50 so as to abut the inner sides of depending portions or flanges 17 and 18 so that the holder element 49 is positioned, as indicated in dotted lines in FIGS. 2 and 8 within the extension 15. The ears 51 are spot welded as at 52 to permanently fix the holder element 49 therein to the depending portions. It will also be noted that the top 53 of the holder when it is secured to extension 15 is disposed in contact with the plate 16 thereof. The spot welding of the holder element 49 for holding the clamp 47 thereon locks the assembled clamp and pivot pin in place in the extension without requiring any heads on the pivot pins as used heretofore, and without requiring any rivets to wear loose as in previously used handles.

The forward end of the clamp element 47 is shaped in the manner shown most clearly in FIGS. 1 and 8 and includes at its forward end 55 a downwardly and outwardly extending edge, thereafter curved as at 56 and extending into a straight horizontal portion 57 with a round eyelet portion 58 adapted to received the pivot pin 48 therein with a similar rounded portion 59 directly below it extending into the elongated straight horizontal portion or tongue 46, which rear end of the tongue is adapted to engage the cam 42.

The cam 42 is actuated in response to the rotation of the handle end portion 14 and since the shape of the cam is such as to be of narrower width than its length, a 90° rotation of the cam, as shown in FIG. 9 in the direction indicated therein by the arrow, will permit the tongue 46 to move upwardly and permit pivoting of the clamp element 47 such as to drop the forward end portion thereof and release the lip 11 as will be clearly apparent since the clamp element 47 is disposed within extension 15 so that its edge 55 will engage the lower side of the dish lip 12.

To engage the lip or handle portion 12 of the saucepan, it is merely necessary to rotate the end portion 14 back to its normal position which is an upright position as shown in FIGS. 1 and 2.

By this construction, the handle 10 may be quickly and easily engaged with and disengaged from the associated dish or casserole 11.

Thus from the foregoing description, it will be readily observed that the detachable handle means of the present invention is provided with a tapered clip for connecting the clamping extension to a plastic body handle in a rigid manner to compensate for any variations in the size of the handle.

It is also readily apparent that the pivot pin and the pivot pin holder are assembled in a unit and welded in place, thus eliminating the use of heads or rivets which will wear and make the structure loosened. It will further be noted that angled detent or ear means are provided in the clamping extension for disposition in angled complementary recesses in the extension on the handle portion so the clamping structure cannot slide longitudinally thereof, or off of the handle once the tapered clip is pressed into the recess provided in the extension.

Inasmuch as various changes may be made in the form, location and relative arrangement of the several parts without departing from the essential characteristics of the invention, it will be understood that the invention is not to be limited except by the scope of the appended claims.

I claim:
1. A detachable handle for a utensil such as a saucepan, comprising an elongate handle section having a forward end extension, means on the forward end of the handle for coupling the latter to a utensil, said means including a plate body having a forward end, side flanges and a rearward end, the rearward end of the plate body having top and side flanges engaging around said forward end extension, said side flanges having inwardly extending portions engaging an underside of said handle extension, means forming an interlocking coupling between said inwardly extending portions securing said rear end of the body and flanges to the handle extension, and inturned lug members carried by the rear ends of said side flanges and engaging in recesses in said handle end extension and preventing relative longitudinal movement between the handle and the plate body.

2. The invention according to claim 1, wherein the said underside of said handle end extension has a longitudinal rib bordering each of two sides and each of said inwardly extending portions of said flanges has a trough portion in which a rib is engaged and said interlocking coupling lying between said ribs.

3. The invention according to claim 2, wherein said interlocking coupling consists of oppositely directed flanges bordering each of said inwardly extending portions and a coupling clip spanning the last mentioned flanges and having inturned flanges secured between the said last mentioned flanges and the said inwardly extending portions.

4. The invention according to claim 1, wherein the said coupling means further includes a clamping element, and means rockably supporting the clamping element between the plate body flanges comprising a pivot pin and a means secured to the inner sides of said plate body flanges and having the ends of the pivot pin mounted thereon with the pin extending across the width of the plate body and interposed between and having its ends covered by the said body flanges.

5. The invention according to claim 1, wherein the said coupling means further includes a clamping element, and means rockably supporting the clamping element between the plate body flanges comprising a pivot pin and a pivot pin holder, said holder being substantially U-shaped and extending across the width of the plate body and lying between the plate body flanges and having oppositely disposed flat legs positioned against the inner sides of the adjacent flanges and secured thereto by a weld, the said flat legs having aligned openings in which the ends of the pin element are engaged to support the pin element between said legs and the said ends of said pin element being covered by the plate flanges.

6. A detachable handle for a utensil such as a saucepan, comprising an elongate handle section having a forward end extension, means on said forward end extension of the handle for coupling the latter to a utensil, said means including a plate body having a forward end, side flanges and a rearward end and having top and under sides, a jaw member for coaction with said forward end of the plate body for coupling the handle to the utensil, a pivot support for the jaw member comprising a substantially U-shaped member disposed across the width of the plate body between the flanges and having oppositely disposed flat legs adjacent to the inner sides of and secured to the flanges, the said legs having aligned openings, a pivot pin having ends engaged in said openings and connecting said legs and having its ends opposed to and covered by said plate flanges, said jaw member being supported by and rockable on the axis of the pivot pin, means for rocking the jaw member relative to the plate, the rearward end of the plate body and flanges engaging around said forward end extension of the handle section, said side flanges having inwardly extending portions engaging an underside of said handle extension, means forming an interlocking coupling between said inwardly extending portions of the side flanges and securing said rear end of the body and flanges to the handle extension, and inturned lug members carried by said side flanges at the rearward edges thereof and engaging in recesses in said handle end extension and preventing relative longitudinal movement between the handle and the plate body.

7. A detachable handle for saucepans and the like, comprising an elongate handle section, a clamping assembly adjacent to one end thereof and including a pivoted clamped element for releasably gripping a part of the saucepan, means operatively connected to said clamp element to pivotally actuate the same, and means permanently securing said clamping assembly and handle section together and comprising a part of said clamping assembly enclosing an end portion of the handle section and having spaced inturned, longitudinal portions bordered by oppositely projecting outurned flanges, and a clip means having interlocking connection with the said flanges and securing the same in drawn together relation to maintain the handle section end enclosing part in gripping engagement with the handle section end and said part of the clamping assembly further including means engaging in recesses in opposite sides of the handle section end portion and preventing relative longitudinal movement between the handle section and the clamping assembly.

8. The invention as defined by claim 7 wherein said handle section end portion has transversely spaced longitudinally extending ribs forming a longitudinal recess and said inturned longitudinal portions of the clamping assembly extend across said ribs and engage in said recess.

9. A handle structure for detachable connection to a portion of a utensil, said handle structure comprising an elongate handle body having a reduced forward end extension, said extension having an underside bordered by transversely spaced longitudinal ribs providing a longitudinal recess therebetween, the body extension further having a recess in each of two opposite sides, a clamping assembly on and extending from said end extension in the longitudinal direction of the handle body, said clamping assembly comprising an elongate plate having a forward end and a rearward end and having bordering longitudinal edge flanges, the plate with its bordering flanges being relatively disposed in a rear end portion thereof to snugly receive said reduced end extension of the handle body, each of said flanges being bordered at the rearward end by an inwardly directed flange lying across an adjacent rib of the handle extension and then extending upwardly into and emerging with a part directed transversely of the bottom of the recess, said transversely directed parts being in spaced opposed relation in the recess and terminating in downwardly and laterally projecting longitudinal flanges which are in rearwardly divergent relation, a tapered clip extending between said divergently related flanges and having inturned legs held between said transversely directed parts and the last mentioned flanges, means carried by each of the first mentioned flanges at the rear end edges thereof for engagement in said recesses in the sides of the handle extension, and means carried by and coacting with the plate body for gripping a portion of a utensil.

References Cited in the file of this patent
UNITED STATES PATENTS

| | | |
|---|---|---|
| 2,403,839 | Adolph | July 9, 1946 |
| 2,851,299 | Serio | Sept. 9, 1958 |
| 3,065,016 | Serio | Nov. 20, 1962 |

FOREIGN PATENTS

| | | |
|---|---|---|
| 49,828 | Sweden | of 1921 |